United States Patent [19]
Dworkin et al.

[11] Patent Number: 5,982,895
[45] Date of Patent: Nov. 9, 1999

[54] FINITE FIELD INVERSE CIRCUIT FOR USE IN AN ELLIPTIC CURVE PROCESSOR

[75] Inventors: James Douglas Dworkin; Michael John Torla, both of Chandler, Ariz.; Scott Alexander Vanstone, Waterloo, Canada

[73] Assignees: Motorola, Inc., Schaumburg, Ill.; Certicom Corp., Mississauga, Canada

[21] Appl. No.: 08/997,963

[22] Filed: Dec. 24, 1997

[51] Int. Cl.⁶ .................................................. H04K 1/02
[52] U.S. Cl. ................................. 380/9; 380/59; 380/28
[58] Field of Search .................... 380/9, 25, 28; 708/190

[56] References Cited

U.S. PATENT DOCUMENTS

| | | | |
|---|---|---|---|
| 5,555,516 | 9/1996 | Zook | 364/746.1 |
| 5,854,759 | 12/1998 | Kaliski, Jr. et al. | 364/746.1 |

*Primary Examiner*—Tod R. Swann
*Assistant Examiner*—Trevor Coddington
*Attorney, Agent, or Firm*—Gregg Rasor

[57] ABSTRACT

A finite field inverse circuit (600) for use in an elliptic curve processor (12). The finite field inverse circuit (600) comprises a control circuit (610) and a data circuit (660). The data circuit (610) comprises a data multiplexer (668) for coupling the contents of one of three registers (662, 664, 680) to a finite field arithmetic logic unit (122). A first plurality of bits representing the finite field element to be inverted is initially loaded into a first one of the three registers. The control circuit (660) comprises a shift register (614) suitable for storing a second plurality of bits representing a size of the finite field element to be inverted. Counter and detection circuitry (630) is provided and coupled to the shift register (614) to decrement, shift and detect contents of the shift register (614) that generates control signals (CS1, CS2 and CS3) connected to the control signal inputs (C1, C2 and C3) of the multiplexer (668) of the data circuit (660) in order to cause a series of finite field operations to be performed upon the contents of the three registers (662, 664 and 680) to compute an inverse of the first plurality of bits representing the finite field element.

24 Claims, 5 Drawing Sheets

FINITE FIELD INVERSE CIRCUIT FOR USE IN AN ELLIPTIC CURVE PROCESSOR

FIELD OF THE INVENTION

The present invention is directed to wireless communication technology where secure communication is achieved using elliptic curve cryptographic techniques, and more particularly to a circuit for performing a finite field inverse operation with minimal finite field arithmetic operations.

BACKGROUND OF THE INVENTION

Secure communication of information afforded by encryption techniques is desirable in the field of wireless communication devices, such as pagers, cellular telephones, etc. In these environments, there is a need to minimize the amount of information transmitted to control costs and profitability of systems. When the data to be transmitted is encrypted, it is still desirable to minimize the overall amount of data actually transmitted.

Elliptic curve (EC) cryptography has become particularly useful in the field of wireless communication because it is more efficient both in terms of bandwidth and computation time than other public key industry encryption standards, such as RSA. An EC processor includes a finite field arithmetic logic unit (ALU) which performs the lowest level finite field arithmetic operations upon an EC point.

One particular operation to be performed by a finite field ALU is a finite field inverse operation. In EC cryptosystems, the size of the finite field is represented by as many as 160 bits or more. Therefore, computing the inverse of a field element is a costly task to perform, in terms of software or hardware allocation. There are several known arithmetic processes for computing a finite field inverse. One is the Extended Euclidean Algorithm. Others involve the repeated use of finite field squaring and multiplying operations.

The present invention is directed to a finite field inverse circuit and method which minimizes the number of finite field arithmetic operations.

DESCRIPTION OF A PREFERRED EMBODIMENT

Figure 1:
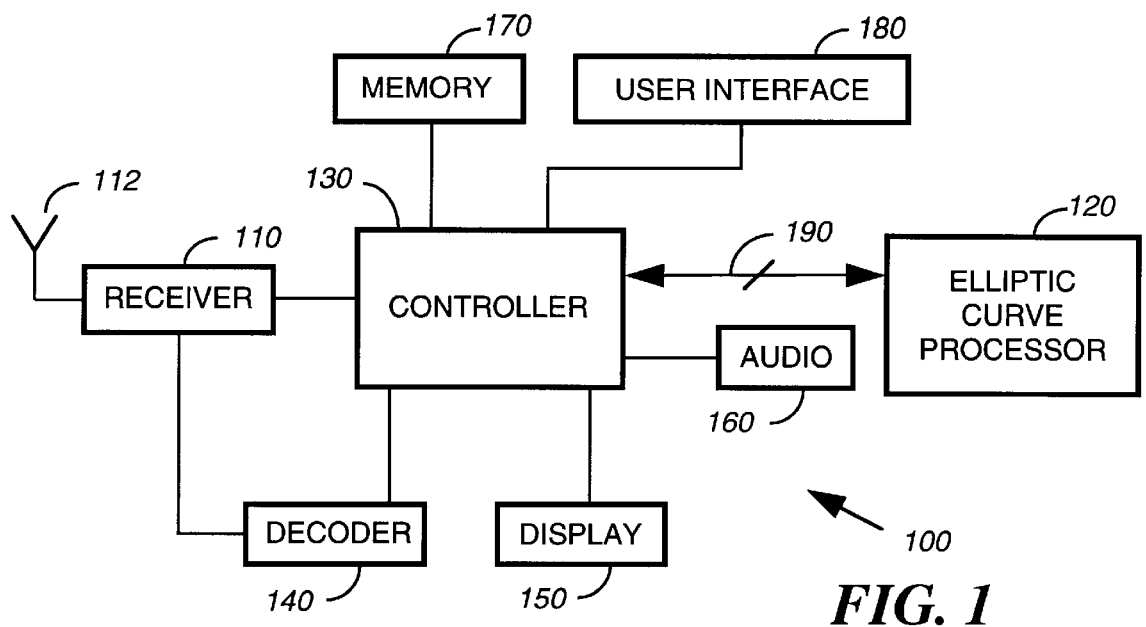
FIG. 1 is a block diagram of a communication device suitable for receiving and processing elliptic curve points in accordance with the present invention.

FIG. 1 illustrates a communication device 100 comprising, of most importance to the present invention, a receiver 110, a controller 130 and an elliptic curve (EC) processor 120. Information transmitted by way of radio frequency (RF) signals are detected by the antenna 112 and received by the receiver 110. In the case where the communication device is a selective call receiver (pager), the information is processed by a decoder 140 in accordance with protocol rules and definitions, such as those set by the FLEX™ paging protocol technology developed by Motorola, Inc. The controller 130 processes the received information for display on a display device 150 or, in the case of voice, for playback of voice on an audio output device 160. The controller 130 accesses information in memory 170 to, for example, compare a received paging address with a stored address. Received message information is also stored in the memory 170. User access and control of the communication device is by way of user interface 180. The controller 130 exchanges information with the EC processor 120 via a host bus 190.

The receiver 110 is a radio frequency (RF) receiver, for example. The controller 130 is embodied by a microprocessor, for example, and processes information extracted from the received signal. The controller 130 may also perform the functions of the decoder 140. The controller 130 is the point of control for the communication device 100. It stores received information in memory 170, compares received information with stored information (such as paging addresses), receives user input from the user interface 180 and displays information on the display 150. The elliptic curve processor 120 is preferably embodied as an application specific integrated circuit (ASIC) or "chip set" which is adapted to be incorporated into communication devices, such as the one shown in FIG. 1. In some applications, the elliptic curve processor 120 and the controller 130 are incorporated in one integrated circuit.

Figure 2:
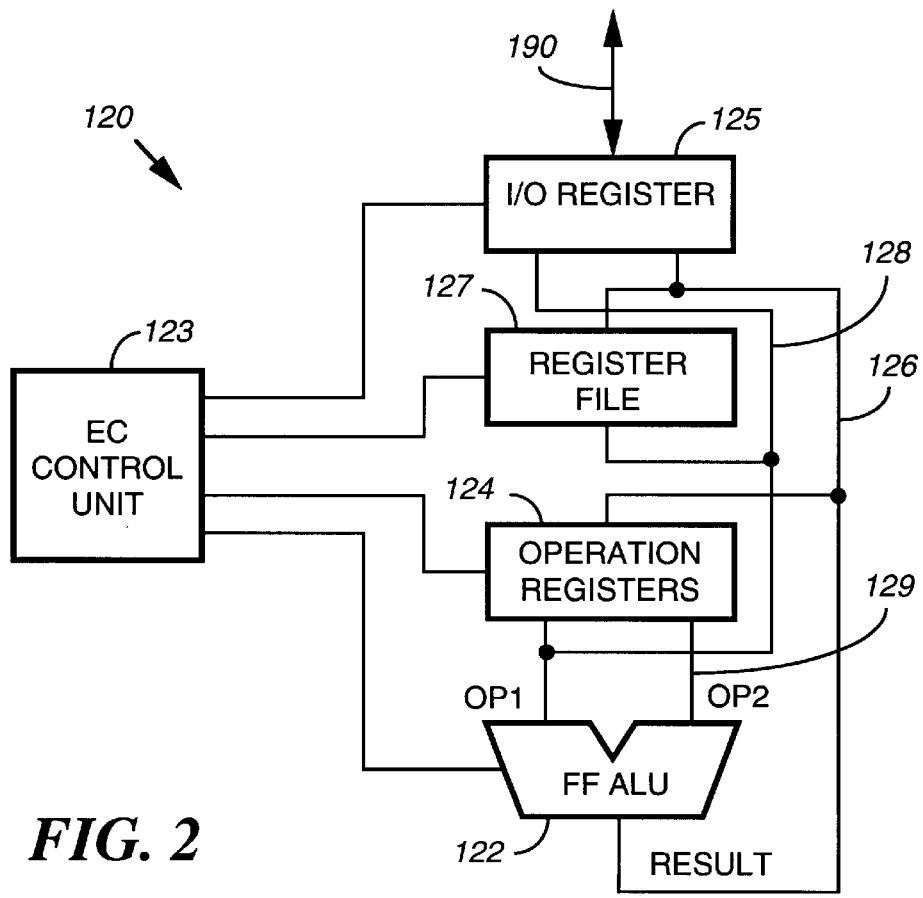
FIG. 2 is a block diagram of an elliptic curve processor according to the present invention.

Turning to FIG. 2, the EC processor 120 will be described in greater detail. The EC processor 120 is a hardware circuit that processes EC points embedded in the received information in order to decrypt the EC points and generate the corresponding data or message. The EC processor 120 comprises a finite field (FF) arithmetic logic unit (ALU) 122, an EC control unit 123, operation registers 124, an input/output (I/O) register 125, and a register file 127. The finite field ALU 122 has inputs for receiving first and second operands from a first operations bus 128 and a second operations bus 129, respectively. The result of a finite field operation is returned on the result bus 126. Data to be processed by the EC processor 120 is received via the I/O register 125 and processed data is returned via the I/O register 125. The operation buses 128 and 129 and the result bus 126 are of the same bit width as the parallel computation capability of the FF ALU 122. For example, the FF ALU 122 may have a 246 bit parallel processing capability. The EC control unit 123 controls the operation of the EC processor 120. Instructions for controlling the operation of the EC processor are stored in a read only memory (ROM) internal to the EC control unit 123.

Figure 3:
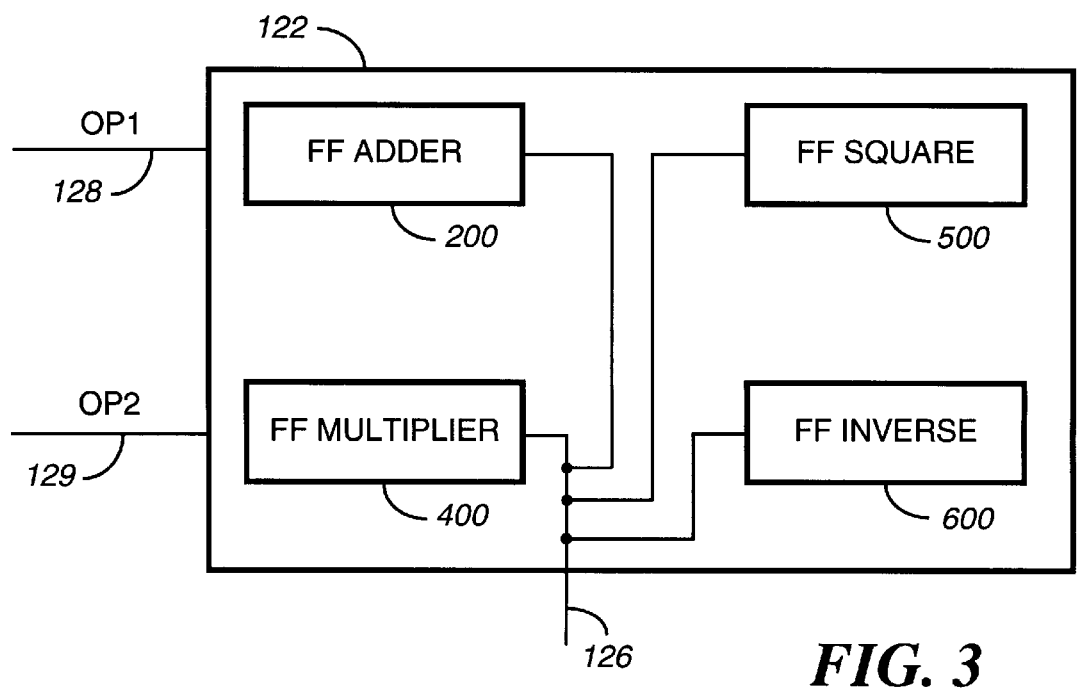
FIG. 3 is a block diagram of a finite field arithmetic logic unit forming a part of an elliptic curve processor shown in FIG. 2.

As is well known in the art, processing of elliptic curve points involves the use of one or more finite field operations. The EC processor 120 coordinates these operations with the finite field ALU 122. These operations are performed by the circuits shown in FIG. 3, including a FF adder 300, FF multiplier 400, FF square 500 and FF inverse 600. The EC processor 120 processes EC points to generate decrypted data and returns the decrypted data to the controller 130. In some cases, one FF circuit calls upon the operations of another by placing operand data on the operations buses 128 and 129. The EC control unit 123 configures the FF ALU 122 so as to invoke the desired arithmetic circuit depending on the operations to be performed.

The EC point represents encrypted or "signed" data, such as financial data, text data, graphics data, voice, etc. Each EC point is therefore an important element, albeit encrypted, of the desired data. In accordance with the present invention, the EC processor 120 includes an improved FF inverse circuit 600 to efficiently compute an inverse of a finite field element in the course of processing an elliptic curve point.

A brief discussion of the relevant basic principles of elliptic curve cryptography follows as it pertains to the present invention. An EC point comprises an X coordinate and a Y coordinate, each represented by a plurality of bits. In processing an EC point, it is necessary to compute the FF inverse of either the X coordinate or Y coordinate (or some variation thereof). The first plurality of bits representing the FF element, such as an X coordinate or Y coordinate, to be inverted, is referred to as $\beta$ hereinafter.

Given an element of a finite field, $\beta$, the inverse of that element, denoted $\beta^{-1}$, is another element of the finite field that, when multiplied by $\beta$, returns the identity element. That is, $\beta*\beta^{-1}=1$. In EC cryptosystems, the size of the finite field is represented by as many as 160 bits or more. Due to the large number of bits used to represent an elliptic curve point, traditional circuitry for computing inverses is impractical.

The circuit for performing a finite field inverse operation according to the present invention is based on several mathematical properties in any finite field. Specifically, in a finite field F(p), any element raised to the power of the field size p is that element itself. That is, $\beta^p = \beta$. It follows that $\beta^{p-1}=1$ and $\beta^{p-2}=\beta^{-1}$. This sets out a mathematical basis for computing the finite field inverse of $\beta$. In an EC cryptosystem implemented over the Galois finite field $GF(2^m)$, where m is the size of the finite field, the inverse of $\beta$ is found by computing the equation:

$\beta^Z = \beta^{-1}$, where $Z=2^m-2$. Through several changes in variables shown in the Appendix, a method and circuit is defined to compute the inverse of $\beta$. The equations in the Appendix are for the example where m=131.

Figure 4:
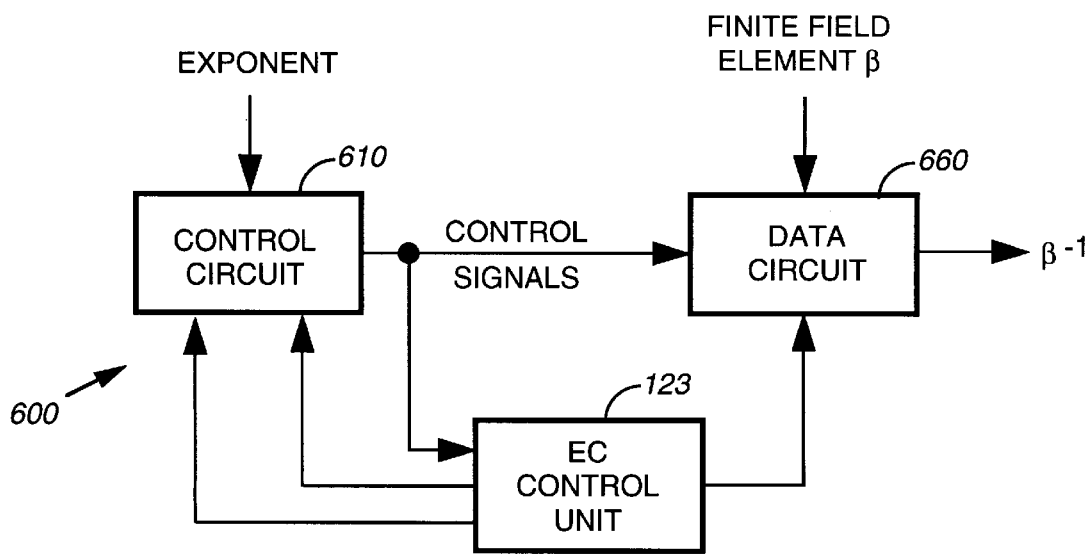
FIG. 4 is a block diagram showing the control circuit and data circuit portions of the finite field inverse circuit according to the present invention.

FIG. 4 illustrates the FF inverse circuit 600 generally. The FF inverse circuit 600 comprises a control circuit 610 and a data circuit 660. The control circuit 610 is clocked by a clock signal supplied by the EC control unit 123 and generates control signals for controlling the operation of the data circuit 660. The data circuit 660 receives as input a first plurality of bits representing $\beta$, the element for which the finite field inverse is to be computed. The exponent m is represented by a second plurality of bits which corresponds to the finite field size and thus represents the sequence of squares and multiplies required to invert $\beta$. The exponent is loaded into the control circuit 610. The EC control unit 123 controls the control circuit 610 and data circuit 660.

Figure 5:
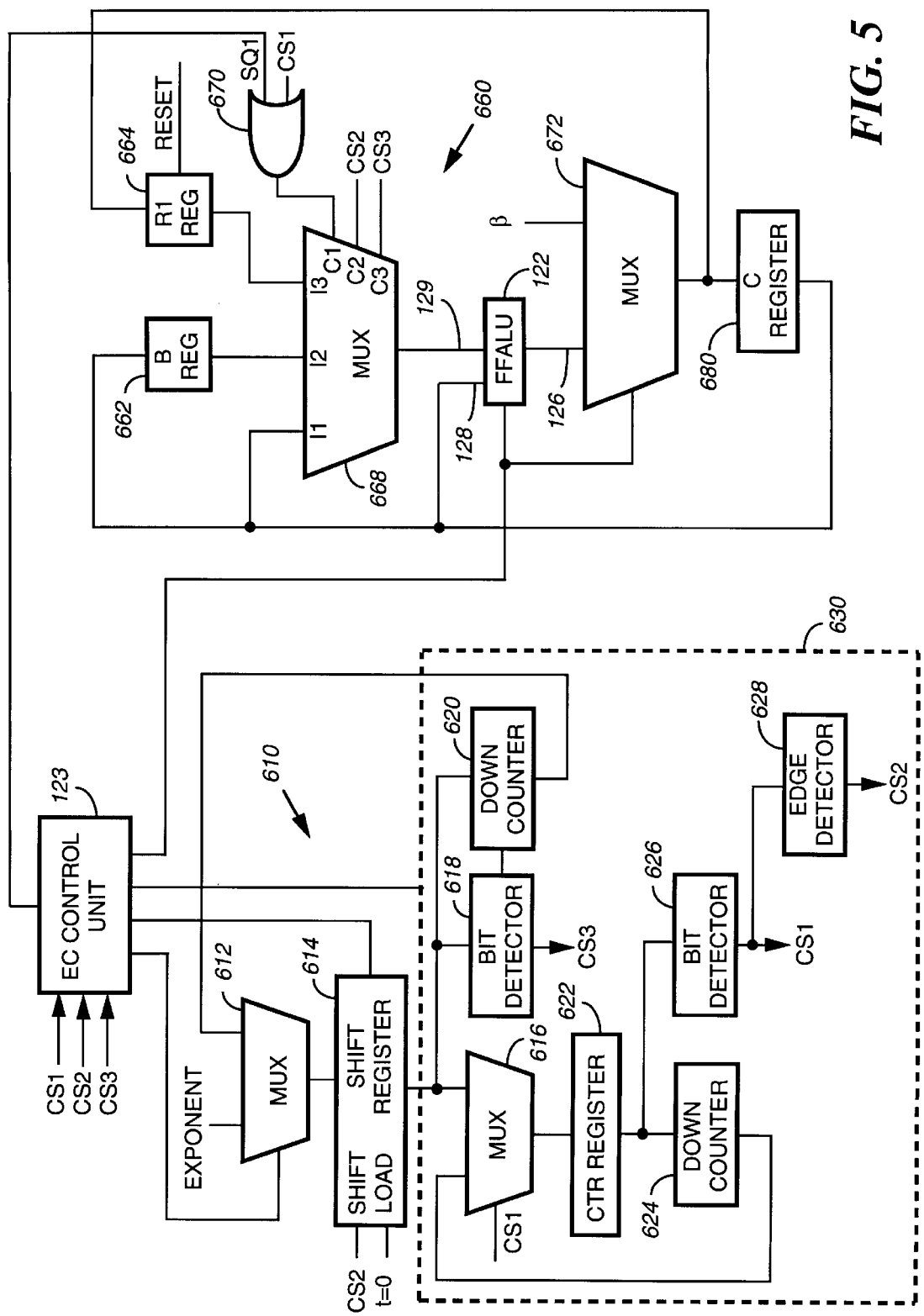
FIG. 5 is a detailed schematic diagram of the control circuit and the data circuit of the finite field inverse circuit.

Turning to FIG. 5, the control circuit 610 and data circuit 660 are shown in greater detail. The control circuit 610 comprises a first multiplexer (MUX) 612 having two inputs and one output connected to a shift register 614. The shift register 614 has a shift control and a load control. Counter and detection circuitry 630 controls the contents of the shift register 614 and generates control signals which are coupled to the data circuit 610 as will be explained further hereinafter. The counter and detection circuitry 630 comprises a second MUX 616, a first bit detector 618, a first down counter 620, a counter (CTR) register 622, a second down counter 624, a second bit detector 626 and an edge detector 628. The second MUX 616 has a first input and a second input. The output of the shift register 614 is connected to the first input of the MUX 616 and also to the first bit detector 618 and the first down counter 620. The bus connection between the first input of the MUX 616 and the output of the shift register 614 is such that the MUX 616 receives the contents of the shift register 614 shifted one bit the right. That is, the least significant bit received by the MUX 616 is the next to least significant bit of the shift register contents, and so on. The most significant bit of the first input of the MUX 616 is filled with a "0".

The first down counter 620 is in turn connected to a second input of the first MUX 612. The single output of the second MUX 616 is connected to the CTR register 622, which in turn is connected to the second down counter 624 and the second bit detector 626. The edge detector 628 is connected to the second bit detector 626. The output of the second down counter 624 is connected to the second input of the second MUX 616.

The following summarizes the capability and functions of the various circuits of the control circuit 610. The first MUX 612 has sufficient bit capability to accommodate the bit width of the exponent. Similarly, the shift register 614 is of sufficient bit width to accommodate the second plurality of bits representing the exponent, and shifts one bit to the right when a logic "1" is applied to its shift control input. The first and second bit detectors 618 and 626 are comparator circuits which receive a content of a register and compare that content with an expected result. If the content is identical to the expected result, they output a logic "1" and otherwise output a logic "0". The first and second bit detectors 618 and 626 have sufficient bit width to accommodate as many bits as that of the exponent. The first bit detector 618 performs two types of comparisons and is controlled by the EC control unit 123 at appropriate times to perform the desired comparison. The expected value that the first bit detector 618 compares with varies depending on the desired operation, as will be explained hereinafter. The CTR register 622 is an exponent-wide counter register. The down counter 622 receives a given input (count) value and outputs that value decremented by 1. The edge detector 628 is a synchronous circuit device which stores the value at its input during the previous clock cycle and outputs a logic "1" if in the current clock cycle, the input is a logic "0" and the input in the previous clock cycle was a logic "1", or vica versa. Any other condition results in an output value of "0".

The respective outputs of the first bit detector 618, second bit detector 626 and edge detector 628 are control signals which are coupled to the data circuit 660. In particular, the output of the second bit detector 626 is a first control signal CS1. The output of the edge detector 628 is a second control signal CS2. The output of the first bit detector 618 is a third control signal CS3. These signals are used to control the data circuit 660. In addition, the control signal CS2 is connected to the shift control input of the shift register 614 and the control signal CS1 is connected to the MUX 616 to control when the CTR register gets loaded. The control signal CS1 is high whenever the content of the CTR register is non-zero, otherwise it is low. The control signal CS2 is goes high on the next clock cycle when CS1 transitions from "1" to "0". When CS1 is high, the CTR register is loaded with the output of the down counter 624, and otherwise, it is loaded with the right shifted contents of the shift register 614 when enabled to do so by the EC control unit 123. When control CS2 is high (logic "1"), the shift register 614 shifts its contents to the right one bit position.

The data circuit 660 employs three registers: a B register 662, an R1 register 664 and a C register 680. The R1 register 664 has a reset control to reset its value to one (decimal). The B register 662 and R1 register 664 are connected to a first MUX 668 (hereinafter called the data MUX). The data MUX 668 has three inputs I1, I2 and I3. The output of the B register 662 is connected to input I2 and the output of the C register is connected to input I1. The output of the R1 register is connected to input I3 of the data MUX 668. The R1 register 664 is one of the registers in the register file 127 and the B register 662 as well as the C register 680 are separate ones of the operations registers 124. The contents of the B register 662, C register 680 and R1 register 664 are manipulated by the data MUX 668 in order to perform the necessary finite field arithmetic operations to determine the inverse of the first plurality of bits representing the finite field element.

The data MUX 668 also has three control inputs C1, C2 and C3. The signals which drive these control inputs are supplied from the control circuit 610 and from the EC control unit 123. Control signal CS1 from the second bit detector 626 is connected to one input of an OR-gate 670 and the other input to the OR-gate is supplied by the EC control unit 123. The output of the OR-gate is coupled to the control input C1. Control signal CS2 from the edge detector 628 is coupled to the second control input C2. Control signal CS3 from the first bit detector 618 is connected to the third control input C3. The single output of the data MUX 668 is connected to the FF multiplier circuit 400. The data MUX 668 selects and couples the content from either the C register 680, the B register 662 or the R1 register 664 to the second operations bus 129. The contents of the C register 680 is always coupled to the first operations bus 129.

When the SQ1 supplied by the EC control unit 123 or control signal CS1 to the control input C1 is high, the data MUX 668 selects the input I1 so as to cause the FF ALU 122 to act (multiply or square) the C register 680 by itself. When control signal CS2 to the control input C2 is high, the contents of the B register is selected so as to multiply it by the contents of the C register 680. Finally, when control signal CS3 to the control input C3 is high, the contents of the R1 register 664 is selected, to cause the FF ALU 122 to multiply it by the contents of the C register 680. The following description is directed to a general case where the finite field elements are not necessarily in the normal basis representation. In this general case, the FF multiplier circuit 400 is invoked for multiplication operations. However, if the normal basis representation is used, then the FF square circuit 500 is invoked when the contents of the C register 680 is to be multiplied by itself, and consequently the computation process is dramatically faster. In the normal basis representation of a finite field element, each bit is a place holder (a coefficient) of a polynomial. To square a plurality of bits representing a finite field element in the normal basis representation, the bits are rotated left by one bit position, such that the most significant bit cycles down to the least significant bit (this is a property of the mathematics of the field). This can be performed in a single clock cycle. The EC control unit 123 configures the FF ALU 122 to invoke the FF multiplier circuit 400 or the FF square circuit 500, depending on the basis representation. If the normal basis is used, then when CS1 is high, the EC control unit 124 configures the FF ALU 122 to use the FF square circuit 500, and otherwise the FF multiplier circuit 400 is used.

The output from the FF ALU 122 returned on the result bus 126 is connected to one input of a second MUX 672. The other input of the MUX 672 receives the first plurality of bits representing the element β to be inverted. The single output of the second MUX 672 is connected to the C register 680. The C register stores the current or partially computed finite field inverse of β.

Figure 6:
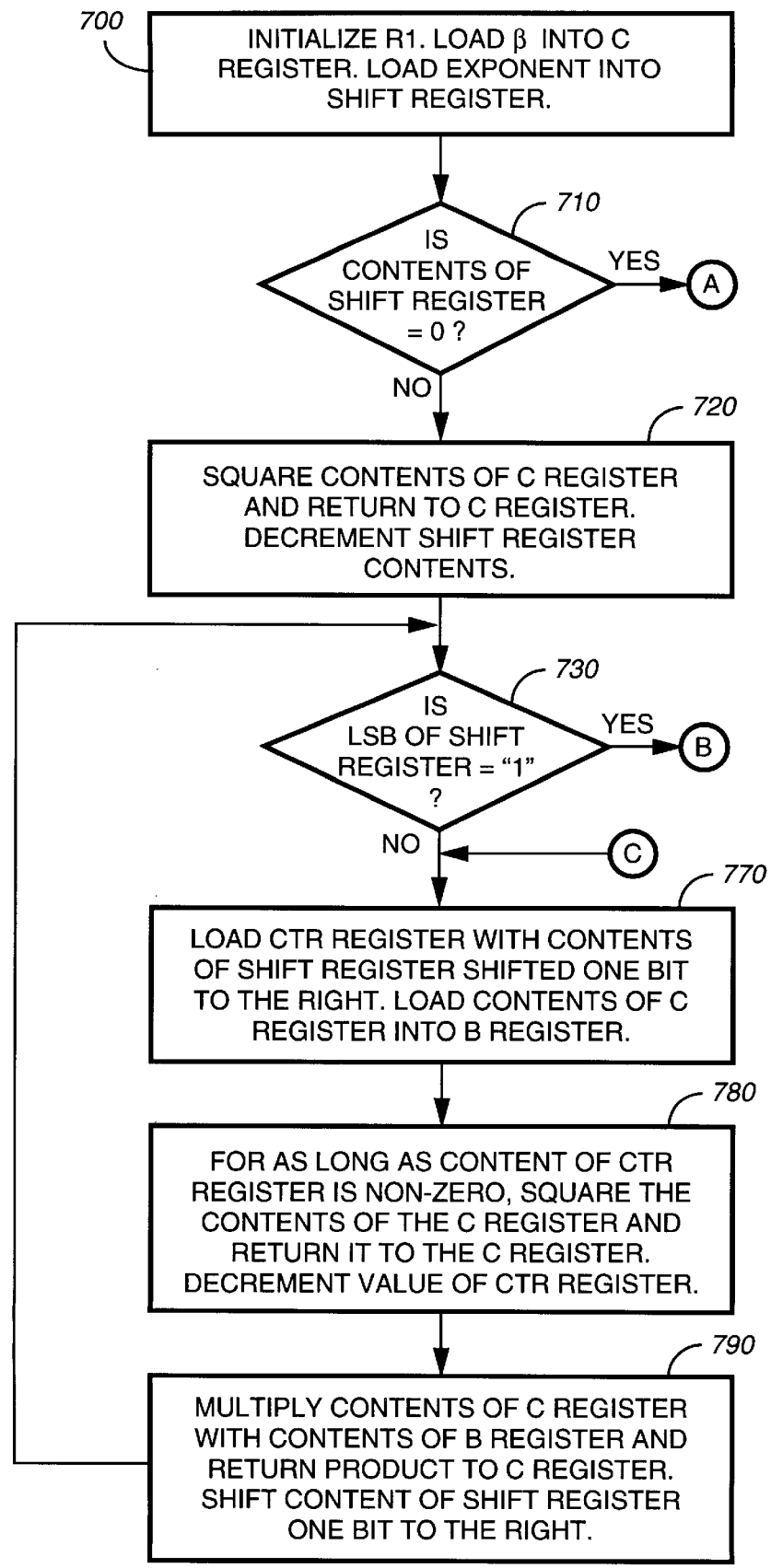
FIGS. 6 and 7 are flow diagrams showing the operation of the finite field inverse circuit according to the present invention.
Figure 7:
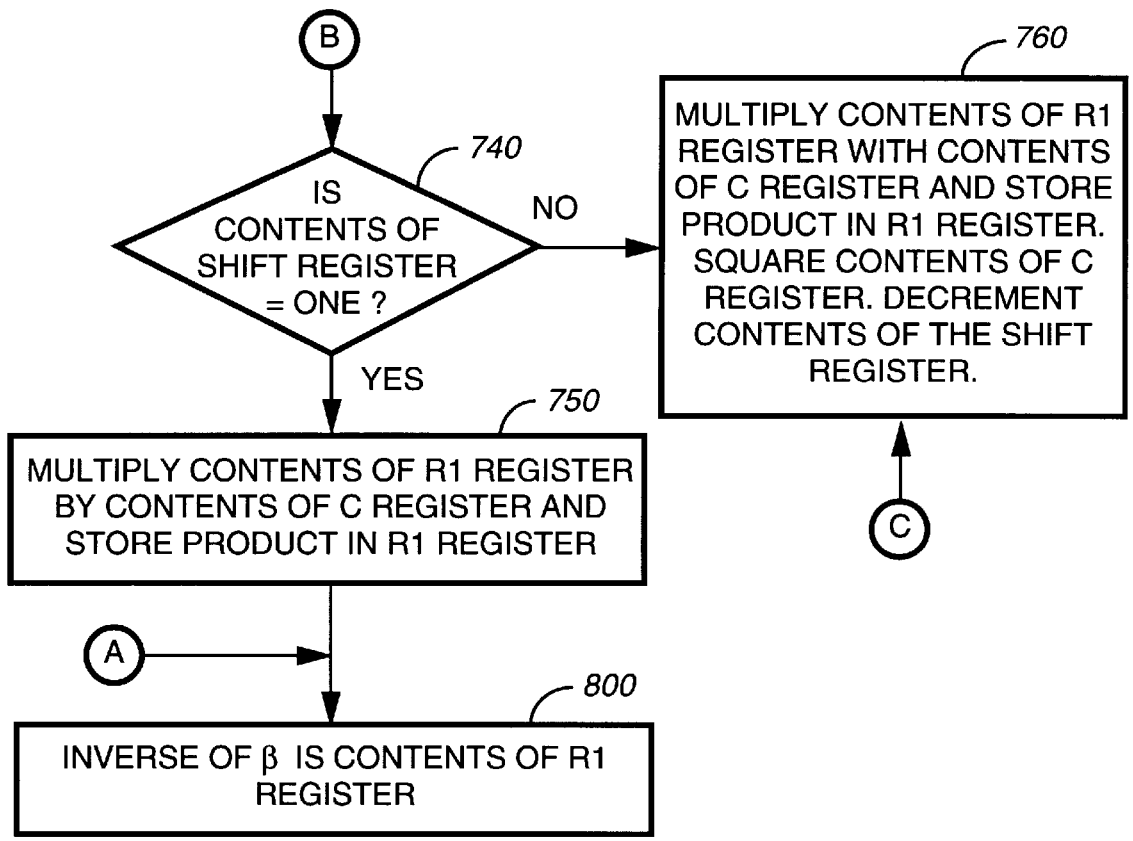

Referring to FIGS. 5–7, the operation of the FF circuit 600 will be described. The EC control unit 123 is connected to the control circuit 610 and data circuit 660 and oversees the operation thereof. Specifically, the EC control unit 123 is connected to the first multiplexer 612, to the shift register 614, and to several circuits in the counter and detection circuitry 630. The EC control unit 123 controls when the down counter 620 and down counter 624 decrement the content of the shift register 614 and CTR register 622, respectively. It controls when the CTR register 622 is loaded via the second MUX 616. In addition, the EC control unit 123 receives the control signals CS1, CS2 and CS3 to control the FF ALU 122. The EC control unit 123 controls the comparison configuration of the bit detector 618. On side of the data circuit 660, the EC control unit 123 is connected to the second MUX 672 to control the loading of the C register 680, loading of the B register 662 and output of the multiplexers 672.

In step 700, at some initial time t=0, the EC control unit 123 controls the second multiplexer 672 to load the first plurality of bits representing the finite field element β to be inverted into the C register 680. At all other times, the other input of the MUX 672 connected to the result bus 126 is selected for output. The R1 register 664 is reset to one and the CTR register 622 is reset to zero, thus the control signal CS1 is low. The EC control unit 123 controls the multiplexer 612 to load second plurality of bits representing the exponent into the shift register 614. At all other times, the EC control unit 123 controls the multiplexer 612 to select for output the input supplied from down counter 620.

In step 710, the EC control unit 123 supplies an all zero bit pattern as the expected value to the first bit detector 618 and the first bit detector 618 compares the contents of the shift register 614 with the all zero bit pattern. If the content of the shift register 614 is all zeros, then in step 800, the inverse of β is 1, the initial contents of the R1 register 664. This is because $\beta^0=1$ for all $\beta$.

If the contents of the shift register is not all zeros, then signal SQ1 from the EC control unit 123 is made high, in step 720, causing the contents of the C register 680 to be coupled to the FF ALU 122 and multiplied by itself, and the contents of the shift register 614 is decremented by the down counter 620. This is the initial arithmetic operation. The arithmetic operations to be performed subsequently depends on whether the content of the shift register 614 represents an odd or even decimal number.

Next, in step 730, the EC control unit 123 samples the content of the least significant bit position of the shift register 614 to determine whether it is a "1", in order to distinguish whether the contents of the shift register represents to an odd number or an even number. If the least significant bit position is a "1", this indicates that the contents of the shift register represents an odd number, the control signal CS3 is made high and the process proceeds to step 740 in FIG. 7, where a first set of finite field arithmetic operations are performed on the contents of the C register 680 and the R1 register 664 (if the content of the shift register 614 is not equal to decimal one). If not, then the process continues to step 770 where a second set of finite field arithmetic operations are performed on the contents of the C register 680 and the B register 662.

In step 740, the EC control unit supplies to the bit detector 618 a plurality of bits corresponding to the decimal number one (00000 . . . 1) and the bit detector 618 compares the content of the shift register 614 to determine if it corresponds to the decimal number one. If so, this means that the exponent has been decremented down to decimal one and one multiplication operation remains to be performed. By virtue of reaching step 740, control signal CS3 has been made high, which in both step 750 and step 760, causes the data MUX 668 to couple the contents of the R1 register 664 and the contents of the C register 680 to the FF ALU 122 to be multiplied together, and the resulting product is stored in the C register 680 and the R1 register 664.

If the content of the shift register 614 is not equal to one, then in step 760, the control signal SQ1 is made high causing the contents of the C register 680 to be multiplied by itself, the result of which is returned to the C register (and to the R1 register 664). Further, the EC control unit 123 controls the down counter 620 to decrement the contents of the shift register 614.

If the content of the shift register 614 is equal to one, then in step 750 the last multiplication operation is performed on the contents of the C register 680 and the R1 register 664. After this last multiplication operation, the contents of the R1 register 664 is a third plurality of bits representing the inverse of $\beta$ and the process is complete. If the path to step 760 is taken, then the process continues to step 770 in FIG. 6.

In step 770, the EC control unit 123 controls the MUX 616 to load the CTR register 622 with the contents of the shift register 614 shifted right one bit. In addition, the EC control unit 123 causes the contents of the C register 680 to be loaded into the B register 662. The bit detector 626 will cause the control signal CS1 to be high at this point since the contents of the CTR register 622 will be non-zero when loaded with the contents of the shift register 614.

In step 780, the CTR register 622 is used to control a number of squaring operations performed on the contents of the C register 680. Control signal CS1 being high causes the data MUX 668 to select the contents of the C register 680 at input I1. At each iteration, the contents of the C register 680 will be multiplied by itself and the contents of the CTR register 622 decremented until it is decremented to zero. The bit detector 626 detects when the contents of the CTR register 622 is zero and causes the control signal CS1 to go low. When the control signal CS1 is made low, the multiplying operations of the contents of the C register are terminated. In step 790, the edge detector 628 detects a change in the level of the control signal CS1 and issues a control signal CS2 so as to cause the contents of the C register 680 to be multiplied by the contents of the B register 664 and to shift the contents of the shift register 614 one bit to the right. The operations of steps 770–790 repeats until the least significant bit of the shift register is equal to 1 as determined in step 730. The process will go to step 740 and ultimately to step 750. Once the last multiplication operation of step 750 is performed, the inverse of the first plurality of bits representing $\beta$ is the content of the R1 register 664 as described above.

The following is an example of the operation of the FF inverse circuit 600 according to the present invention. The finite field size or exponent=46=101110. The content of the various registers in the FF inverse circuit 600 is shown below at each clock cycle:

| Time (t) | C | R1 | B | Register Content Shift Register 614 | CTR Register 622 |
|---|---|---|---|---|---|
| 0 | $\beta$ | 1 | | 101110 (46) | |
| 1 | $\beta^2$ | | | 101101 (45) | |
| 2 | $\beta^4$ | $\beta^2$ | | 101100 (44) | |
| 3 | | | $\beta^4$ | | 10110 (22) |
| 4 | $\beta^8$ | | | | 10101 (21) |

-continued

| Time (t) | C | R1 | B | Register Content Shift Register 614 | CTR Register 622 |
|---|---|---|---|---|---|
| 5–25 | $[\beta^4]Z$ $Z = 2^{22}$ | | | | 0 |
| 26 | $(\beta^4)(\beta^Z)$ $Z = 2^{24}$ | | | 010110 | |
| 27 | | $\beta^4\beta^Z$ $Z = 2^{24}$ | | | 1010 |
| * | | | | | |
| * | | | | | |
| * | | | | | |
| 50 | | | | 000010 | 0 |
| 51 | $\beta^{-1} = C\,(t = 50) * R1\,(t = 50)$ | | | | |

After 50 clock cycles, the inverse of $\beta$ is computed by multiplying the value of the C register at t=50 with the value of the R1 register at t=50.

The data circuit 660 shown in FIG. 5 computes the finite field inverse for any finite field. If the finite field representation is a normal basis representation, the FF square circuit 500 is used in place of the FF multiplier circuit 400 for those instances where the contents of the C register is multiplied by itself. In the course of computing an inverse for a finite field element in the normal basis representation, the EC control unit 123 controls the FF ALU 122 to invoke the operations of the FF square circuit 500, rather than the FF multiplier circuit 400. In this case, there is a extraordinary performance advantage to using the normal basis representation when computing the finite field inverse. This is because the squaring operation on a finite field element in the normal basis can be performed in one clock cycle, whereas the finite field multiplication operation requires m cycles, where m is the finite field size.

The advantage to the circuit described above is that they do not require the use of the Extended Euclidean Algorithm, which is very costly to implement in hardware. For example, the present invention requires the following number of multiplication operations (the multiplication of the contents of R1 register by contents of C register and the multiplication of the contents of the C register by the contents of the B register) for these field sizes in the normal basis representation:

| Field Size | Number of bits | Number of Multiplications |
|---|---|---|
| 113 = 1110001 | 7 | 8 |
| 131 = 10000011 | 8 | 8 |
| 155 = 10111111 | 8 | 10 |
| 191 = 10111111 | 8 | 12 |
| 209 = 11010001 | 8 | 9 |

In general, the number of multiplications=(number of bits–1)+(number of "1's" in the exponent–1)–1.

APPENDIX

TABLE 1

Finite Field Inverse Example in GF($2^{131}$)

| Relation | Change of Variable | Multiples | Squares |
|---|---|---|---|
| $\beta^{-1} = \beta^{2^{131}-2}$ $= (\beta^2)^{2^{130}-1}$ $= (\alpha)^{(2^{65}+1)(2^{65}-1)}$ | $\alpha = \beta^{-2}$ | | 1 |

TABLE 1-continued

Finite Field Inverse Example in GF($2^{131}$)

| Relation | Change of Variable | Multiples | Squares |
|---|---|---|---|
| $= (\alpha\alpha^{2^{65}})^{(2^{65}-1)}$ <br> $= \gamma^{(2^{65}-1)}$ <br> $= \gamma^{(2^{65}-1-1+1)}$ | $\gamma = \alpha\alpha^{2^{65}}$ | 1 | 65 |
| $= \gamma(\gamma^2)^{(2^{64}-1)}$ <br> $= \gamma\delta^{(2^{32}-1)(2^{32}+1)}$ | $\delta = \gamma^2$ | | 1 |
| $= \gamma(\delta\delta^{2^{32}})^{(2^{32}-1)}$ <br> $= \gamma(\epsilon)^{(2^{16}+1)(2^{16}-1)}$ | $\epsilon = \delta\delta^{2^{32}}$ | 1 | 32 |
| $= (\epsilon\epsilon^{2^{16}})^{(2^{16}-1)}$ <br> $= \gamma(\eta)^{(2^{8}+1)(2^{8}-1)}$ | $\eta = \epsilon\epsilon^{2^{16}}$ | 1 | 16 |
| $= \gamma(\eta\eta^{2^{8}})^{(2^{8}-1)}$ <br> $= \gamma(\theta)^{(2^{4}+1)(2^{4}-1)}$ | $\theta = \eta\eta^{2^{8}}$ | 1 | 8 |
| $= \gamma(\theta\theta^{2^{4}})^{(2^{4}-1)}$ <br> $= \gamma(\omega)^{(2^{2}+1)(2^{2}-1)}$ | $\omega = \theta\theta^{2^{4}}$ | 1 | 4 |
| $= \gamma(\omega\omega^{2^{2}})^{(2^{2}-1)}$ <br> $= \gamma(\psi\psi^2)$ | $\psi = \omega\omega^{2^{2}}$ | 1 <br> 2 | 2 <br> 1 |
| | TOTALS | 8 | 130 |

The above description is intended by way of example only and is not intended to limit the present invention in any way except as set forth in the following claims.

What is claimed is:

1. An elliptic curve processing circuit comprising:
 a finite field arithmetic logic unit comprising a finite field multiplier circuit and a finite field square circuit;
 a data circuit connected to the finite field arithmetic logic unit and for receiving as input a first plurality of bits representing a finite field element to be inverted and storing intermediate values computed by the finite field arithmetic logic unit;
 a shift register suitable for storing a second plurality of bits representing a finite field size of the finite field element to be inverted;
 counter and detection circuitry coupled to the shift register to decrement, shift and detect contents of the shift register and generating control signals connected to the data circuit; and
 a control unit connected to the finite field arithmetic logic unit, to the data circuit and to the counter and detection circuitry for controlling operations thereof in order to cause a series of finite field arithmetic operations to be performed upon the first plurality of bits in order to compute the finite field inverse of the first plurality of bits.

2. The elliptic curve processing circuit of claim 1, wherein when a contents of the shift register is initially determined to be non-zero, the counter and detection circuitry generates a control signal to cause the data circuit to supply the first plurality of bits to the finite field arithmetic logic unit to perform an initial arithmetic operation of multiplying the first plurality of bits by itself and to store a result thereof, and to decrement a content of the shift register.

3. The elliptic curve processing circuit of claim 2, wherein after the initial arithmetic operation, the control unit and the counter and detection circuitry generate control signals to perform a first set of finite field arithmetic operations on the contents of a first register when the contents of the shift register is determined to correspond to an even decimal number, and a second set of finite field arithmetic operations on the contents of the first register when the contents of the shift register is determined to correspond to an odd decimal number.

4. The elliptic curve processing circuit of claim 3, wherein the control unit and counter and detection circuitry generate control signals to perform the second set of finite field arithmetic operations after the first set of finite field arithmetic operations are performed.

5. The elliptic curve processing circuit of claim 4, wherein the data circuit comprises a first register having an input and an output, and for initially storing the first plurality of bits, a second register having an input and an output, the input of the second register connected to the output of the first register, and a third register for initially storing a plurality of bits corresponding to a decimal value of one; wherein the counter and detection circuitry and control unit generate control signals when the content of the shift register is determined to correspond to an odd number for performing the first set of finite field arithmetic operations by: causing the contents of the first register and of the third register to be supplied to the finite field arithmetic logic unit to be multiplied and a product stored in the third register; thereafter causing the contents of the first register to be supplied to the finite field arithmetic logic unit to be multiplied by itself; and thereafter decrementing the contents of the shift register.

6. The elliptic curve processing circuit of claim 5, wherein the counter and detection circuitry further comprises:
 a counter register coupled to the shift register to receive as input the contents of the shift register shifted one bit to the right when the contents of the shift register corresponds to an even number;
 a down counter connected to the output of the counter register to decrement a content of the counter register and return it as input to the counter register;
 the counter and detection circuitry generating control signals for performing the second set of finite field arithmetic operations by: causing the data circuit to supply contents of the first register to the finite field arithmetic logic unit to multiply the contents of the first register by itself repeatedly until the counter register is decremented to zero.

7. The elliptic curve processing circuit of claim 6, wherein the counter and detection circuitry and the control unit, when it is determined that the content of the counter register has been decremented to zero, further control the data circuit to supply contents of the first register and contents of the second register to the finite field arithmetic logic unit to be multiplied and a product returned to the first register, and to shift the contents of the shift register one bit to the right.

8. The elliptic curve processing circuit of claim 7, wherein the counter and detection circuitry comprises a bit detector coupled to the counter register and comparing contents of the counter register to determine when the contents of the counter register is non-zero, and generating as output a first control signal coupled to the data circuit to cause multiplication of the contents if the first register by itself, and a second control signal coupled to the data circuit to terminate multiplication of the contents of the first register when the contents of the counter register is zero.

9. The elliptic curve processing circuit of claim 7, wherein after the contents of the shift register is shifted one bit to the right, the counter and detection circuitry again detect whether the content of the shift register corresponds to an even or odd number so as to perform the first set and second set of arithmetic operations until the contents of the shift register is determined to correspond to the decimal value of one, and if so, the counter and detection circuitry cause the contents of the first register to be multiplied by the contents of the third register, a product of which comprising a third plurality of bits representing the inverse of the first plurality of bits.

10. The elliptic curve processing circuit of claim 7, wherein the control unit controls the finite field arithmetic logic unit to square the contents of the first register for every instance where multiplication of the contents of the first register by itself is required when the first plurality of bits corresponds to a normal basis representation of a finite field element.

11. A communication device comprising the elliptic curve processor circuit of claim 1, and further comprising:

a receiver for receiving radio frequency signals; and a controller coupled to the receiver and to the elliptic curve processing circuit to supply elliptic curve point information embedded in the radio frequency signals for processing by the elliptic curve processing circuit.

12. A selective call receiver comprising the elliptic curve processor circuit of claim 1, and further comprising:

a receiver for receiving radio frequency signals;

a controller coupled to the receiver;

a decoder coupled to the receiver and to the controller, the decoder decoding information in the radio frequency signals; and the controller being coupled to the elliptic curve processing circuit to supply elliptic curve point information embedded in the radio frequency signals for processing by the elliptic curve processing circuit.

13. An elliptic curve processing circuit comprising:

a finite field arithmetic logic unit comprising a finite field multiplier circuit and a finite field square circuit;

a first operations bus and a second operations bus connected to the finite field arithmetic logic unit for supplying operands to the finite field arithmetic logic unit;

a result bus connected to the arithmetic logic unit for receiving results computed by the finite field arithmetic logic unit;

first, second and third registers each having an input and an output, the first register receiving a first plurality of bits representing a finite field element to be inverted, the output of the first register being connected to the input of the second register and to the first operand bus, the third register initially storing a plurality of bits corresponding to a decimal value of one, the input of the first register being coupled to the result bus;

a data multiplexer having first, second and third inputs and first, second and third control inputs, and an output; the output of the first register connected to the first input of the multiplexer, the output of the second register connected to the second input of the multiplexer and the output of the third register connected to third input of the multiplexer, the output of the data multiplexer being connected to the second operand bus;

a shift register suitable for storing a second plurality of bits representing a finite field size of the finite field element to be inverted;

counter and detection circuitry coupled to the shift register to decrement, shift and detect contents of the shift register and generating control signals coupled to the control signal inputs of the data multiplexer;

an elliptic curve control unit connected to the finite field arithmetic logic unit, to the data multiplexer, and to the counter and detection circuitry to generate control signals in order to cause a series of finite field multiplication operations to be performed upon the contents of the first, second and third registers to compute finite field inverse of the first plurality of bits.

14. The elliptic curve processing circuit of claim 13, wherein when a contents of the shift register is initially determined to be non-zero, the counter and detection circuitry generates a control signal to cause the data multiplexer to supply the first plurality of bits to the finite field arithmetic logic unit to perform an initial arithmetic operation of multiplying the first plurality of bits by itself storing a result thereof in the first register, and to decrement the content of the shift register.

15. The elliptic curve processing circuit of claim 14, wherein after the initial arithmetic operation, the elliptic curve control unit and the counter and detection circuitry generate control signals to perform a first set of finite field arithmetic operations on the contents of the first register when the contents of the shift register is determined to correspond to an even decimal number, and a second set of finite field arithmetic operations on the contents of the first register when the contents of the shift register is determined to correspond to an odd decimal number.

16. The elliptic curve processing circuit of claim 15, wherein the elliptic curve control unit and counter and detection circuitry generate control signals to perform the second set of finite field arithmetic operations after the first set of finite field arithmetic operations are performed.

17. The elliptic curve processing circuit of claim 16, wherein the counter and detection circuitry and elliptic curve control unit generate control signals when the content of the shift register is determined to correspond to an odd number for performing the first set of finite field arithmetic operations by: causing the contents of the first register and of the third register to be supplied to the finite field arithmetic logic unit to be multiplied and a product being stored in the third register; thereafter causing the contents of the first register to be supplied to the finite field arithmetic logic unit to be multiplied by itself; and thereafter decrementing the contents of the shift register.

18. The elliptic curve processing circuit of claim 17, wherein the counter and detection circuitry further comprises:

a counter register coupled to the shift register to receive as input the content of the shift register shifted one bit to the right when the contents of the shift register corresponds to an even number;

a down counter connected to the output of the counter register to decrement a content of the counter register and return it as input to the counter register;

the counter and detection circuitry generating control signals for performing the second set of finite field arithmetic operations by: causing the data multiplexer to supply contents of the first register to the finite field arithmetic logic unit to multiply the contents of the first register by itself repeatedly until the counter register is decremented to zero.

19. The elliptic curve processing circuit of claim 18, wherein the counter and detection circuitry and the elliptic curve control unit, when it is determined that the content of the counter register has been decremented to zero, further control the data multiplexer to supply contents of the first register and contents of the second register to the finite field arithmetic logic unit to be multiplied and a product returned to the first register, and to shift the contents of the shift register one bit to the right.

20. The elliptic curve processing circuit of claim 19, wherein after the contents of the shift register is shifted one bit to the right, the counter and detection circuitry again detect whether the content of the shift register corresponds to an even or odd number so as to perform the first set and second set of arithmetic operations until the content of the shift register is determined to correspond to the decimal value of one, and if so, the counter and detection circuitry cause the contents of the first register to be multiplied by the contents of the third register, a product of which comprising a third plurality of bits representing the inverse of the first plurality of bits.

21. The elliptic curve processing circuit of claim 13, wherein the elliptic curve control unit controls the finite field arithmetic logic unit to square the contents of the first register for every instance where multiplication of the contents of the first register by itself is required when the first plurality of bits corresponds to a normal basis representation of a finite field element.

22. A communication device comprising the elliptic curve processor circuit of claim 13 and further comprising:

a receiver for receiving radio frequency signals; and a controller coupled to the receiver and to the elliptic curve processing circuit to supply elliptic curve point information embedded in the radio frequency signals for processing by the elliptic curve processing circuit.

23. A selective call receiver comprising the elliptic curve processor circuit of claim 13, and further comprising:

a receiver for receiving RF signals;

a controller coupled to the receiver;

a decoder coupled to the receiver and to the controller, the decoder decoding information in the RF signals; and the controller being coupled to the elliptic curve processing circuit to supply elliptic curve point information embedded in the radio frequency signals for processing by the elliptic curve processing circuit.

24. In combination, a finite field arithmetic logic comprising a finite field multiplier circuit, a finite field inverse circuit and a finite field square circuit, and a control unit for controlling the finite field arithmetic logic unit, the finite field inverse circuit comprising:

a data circuit coupled to the finite field arithmetic logic unit and for receiving as input a first plurality of bits representing a finite field element to be inverted, supplying the first plurality of bits to the finite field arithmetic logic unit and storing intermediate values of computations performed by the finite field arithmetic logic unit;

a shift register suitable for storing a second plurality of bits representing a finite field size of the finite field element to be inverted; and counter and detection circuitry coupled to the shift register to decrement, shift and detect contents of the shift register and generating control signals connected to the data circuit;

wherein the control unit is connected to the data circuit and to the counter and detection circuitry for controlling operations thereof to cause a series of finite field operations to be performed upon the first plurality of bits in order to compute the finite field inverse of the first plurality of bits.

\* \* \* \* \*